(12) United States Patent
Ovsyannikov et al.

(10) Patent No.: US 7,720,209 B2
(45) Date of Patent: May 18, 2010

(54) DEVELOPING APPLICATION OBJECTS THAT INTEROPERATE WITH EXTERNAL OBJECTS

(75) Inventors: Alexey Ovsyannikov, Copenhagen (DK); Arthur R. Greef, Rungsted Kyst (DK); Christopher D. Williams, Copenhagen (DK); Per Vikkelsoe, Frederiksvaerk (DK)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 11/423,250

(22) Filed: Jun. 9, 2006

(65) Prior Publication Data

US 2008/0002817 A1 Jan. 3, 2008

(51) Int. Cl.
*H04M 3/42* (2006.01)
*G06F 9/44* (2006.01)

(52) U.S. Cl. .................. 379/201.01; 717/100; 717/101; 717/102

(58) Field of Classification Search ............ 379/201.01; 717/130, 102, 101, 100; 709/203
See application file for complete search history.

(56) References Cited

U.S. PATENT DOCUMENTS

| 6,067,477 | A | 5/2000 | Wewalaarachchi et al. |
| 6,442,618 | B1 | 8/2002 | Phillips et al. |
| 6,601,233 | B1* | 7/2003 | Underwood ................ 717/102 |
| 6,779,184 | B1 | 8/2004 | Puri et al. |
| 2002/0162093 | A1* | 10/2002 | Zhou et al. .................. 717/130 |
| 2003/0078960 | A1* | 4/2003 | Murren et al. .............. 709/203 |
| 2003/0225935 | A1 | 12/2003 | Rivard et al. |
| 2004/0015891 | A1 | 1/2004 | Arellano-Payne et al. |
| 2004/0039800 | A1 | 2/2004 | Black et al. |
| 2004/0064826 | A1 | 4/2004 | Lim et al. |
| 2004/0268371 | A1 | 12/2004 | Carrell et al. |
| 2005/0228803 | A1 | 10/2005 | Farmer et al. |
| 2005/0228863 | A1 | 10/2005 | Palmeri et al. |
| 2006/0101412 | A1 | 5/2006 | Lev et al. |

OTHER PUBLICATIONS

Brodie et al., M. L., "An Interoperability Development Environment For Intelligent Information Systems" published in Proceedings of the International Workshop on the Development of Intelligent Information Systems, Apr. 1991.
Bellifemine et al., F., "JADE—A FIPA-compliant agent framework" Proceedings of the Practical Applications of Intelligent Agents and Multi-Agents, pp. 97-108, Apr. 1999.
Watkins, D., "Handling Language Interoperability with the Microsoft .NET Framework" Oct. 2000, http://msdn.microsoft.com/library/default.asp?url=/library/en-us/dndotnet/html/interopdotnet.asp.

* cited by examiner

*Primary Examiner*—Thjuan K Addy
(74) *Attorney, Agent, or Firm*—Westman, Champlin & Kelly, P.A.

(57) ABSTRACT

An application development system includes a referencing component configured to reference an external component in an external development environment and to read type information for the referenced external component. An authoring component is configured to aid a user in authoring an application using the type information read from the referenced external component and using a language extension that allows external objects corresponding to the external component to be created by the external runtime environment and which allows methods to be invoked on the external objects and object declarations.

16 Claims, 10 Drawing Sheets

136-2

| X++ Types | | CLR Value Type | |
|---|---|---|---|
| AnyType | Boolean | Value Type | Boolean |
| AnyType | Date (day, month, and year) | Value Type | DateTime |
| AnyType | Integer (int) | Value Type | Int32 |
| AnyType | Real | Value Type | Decimal |
| AnyType | String (str) | Object | String |
| AnyType | DateTime | Value Type | DateTime |
| AnyType | Enum | Value Type | UInt32 |
| | Null | | null |
| Composite type | Container | Reference Type | List |
| Composite type | Array | Reference Type | Object[] (System.Array) |

FIG. 3-2

```
static void XTestClrStatic(Args _args)
{
    str uriStr = @'file:///C:/Ax_SD/root/Axapta/Prototype/ClrInterop/XmlReaderTest/XMLFile1.xml';
    System.
}
```

┌─────────────────┐
│ ☐ Uri           │
│ ☐ type          │
│ { }namespace    │
└─────────────────┘
402

FIG. 4-1

```
static void XTestClrStatic(Args _args)
{
    str uriStr = @'file:///C:/Ax_SD/root/Axapta/Prototype/ClrInterop/XmlReaderTest/XMLFile1.xml';
    System.Uri  uri;
    System.Exception ex;
    ;
    try
    {
        uri = new System.
```

┌─────────────────┐
│ ☐ Uri           │
│ ☐ type          │
│ { }namespace    │
└─────────────────┘
402

FIG. 4-2

```
static void XTestClrStatic(Args _args)
{
    str uriStr = @'file:///C:/Ax_SD/root/Axapta/Prototype/ClrInterop/XmlReaderTest/XMLFile1.xml';
    System.Uri uri;
    System.Exception ex;
    ;
    try
    {
        uri = new System.Uri(
```

| Uri.Uri(string uriString) |
| Uri.Uri(string uriString, bool escape) |

```
static void XTestClrStatic(Args _args)
{
    str uriStr = @'file:///C:/Ax_SD/root/Axapta/Prototype/ClrInterop/XmlReaderTest/XMLFile1.xml';
    System.Uri uri;
    System.Exception ex;
    ;
    try
    {
        uri = new System.Uri( uriStr );
        print uri.
```

| ☐ method |
| ☐ ToString |
| ☐ method |

```
static void XTestClrStatic(Args _args)
{
    str uriStr = @'file:///C:/Ax_SD/root/Axapta/Prototype/ClrInterop/XmlReaderTest/XMLFile1.xml';
    System.Uri uri;
    System.Exception ex;
    ..
    try
    {
        uri = new System.Uri( uriStr );
        print uri.ToString();
        print System.Guid::
```

- method
- NewGuid
- method

FIG. 4-5

DEVELOPING APPLICATION OBJECTS THAT INTEROPERATE WITH EXTERNAL OBJECTS

BACKGROUND

Often, application developers have spent many years developing application specific programming languages as well as application development and runtime environments that have immature frameworks for interoperating with external objects. The result is that developers are sometimes highly productive when they develop only application components within the primary development environment they are familiar with, but are less productive when they write application components that interoperate ("interop") with externally developed components. Developer productivity is also reduced when application components that interop with external components, compile correctly in the primary application development environment, but fail when they are executed in the primary application runtime environment due to incorrectly programmed interop with the externally developed components. This also results in primary application code that is very error prone.

This scenario can be found in enterprise resource planning (ERP) systems or other business logic applications written in object oriented programming languages in unmanaged code development environments. When a developer of a business application in an unmanaged code development environment wishes to write code to interop with external components compiled using external environments, for example using a managed code environment, productivity can be affected and errors can result if the developer is not as familiar with the external component programming interface and external development environment as he or she is with their primary application development environment.

When doing interop between objects that exist in components compiled by different compilers, the developer may have to address one or more of the following problems: (1) What external component types can be accessed/used from the primary application components? (2) How does one convert (marshal) external component types between different components? and (3) Which external component functions can be called, and what are their arguments?

SUMMARY

Disclosed embodiments provide application developing assistance to aid in the authoring of application components that interop with external components in a primary application development environment. By referencing an external component compiled in an external development environment, and reading type information for the referenced external component, authoring assistance can be provided to a user. Examples of the authoring assistance include auto-completion and other IntelliSense® type functionality such as providing information about types and functions in the external component, as well as compiler type check functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1-2 is another block diagram illustrating the application development system in a computing system environment.

FIGS. 2-1 and 2-2 are representations of graphical user interfaces.

FIG. 3-1 is a general example of a type mapping table.

FIG. 3-2 is one more particular example of a type mapping table.

FIGS. 4-1 through 4-5 are illustrations of auto-completion functions, intellisense and user interfaces.

FIG. 5 is a flow diagram illustrating a method embodiment.

DETAILED DESCRIPTION

Disclosed embodiments aid developers familiar with primary application development environments when they wish to interop with external components compiled by an external development environment. In one non-limiting example, disclosed systems and methods can be used to aid a developer familiar with the Microsoft® X++® programming language when their application components need to interop with external components compiled by managed code environments. Also in non-limiting environments provided as examples only, managed code environments can include the Microsoft® .NET™ platform and the Microsoft® Visual Studio® development environment.

Figure 1:
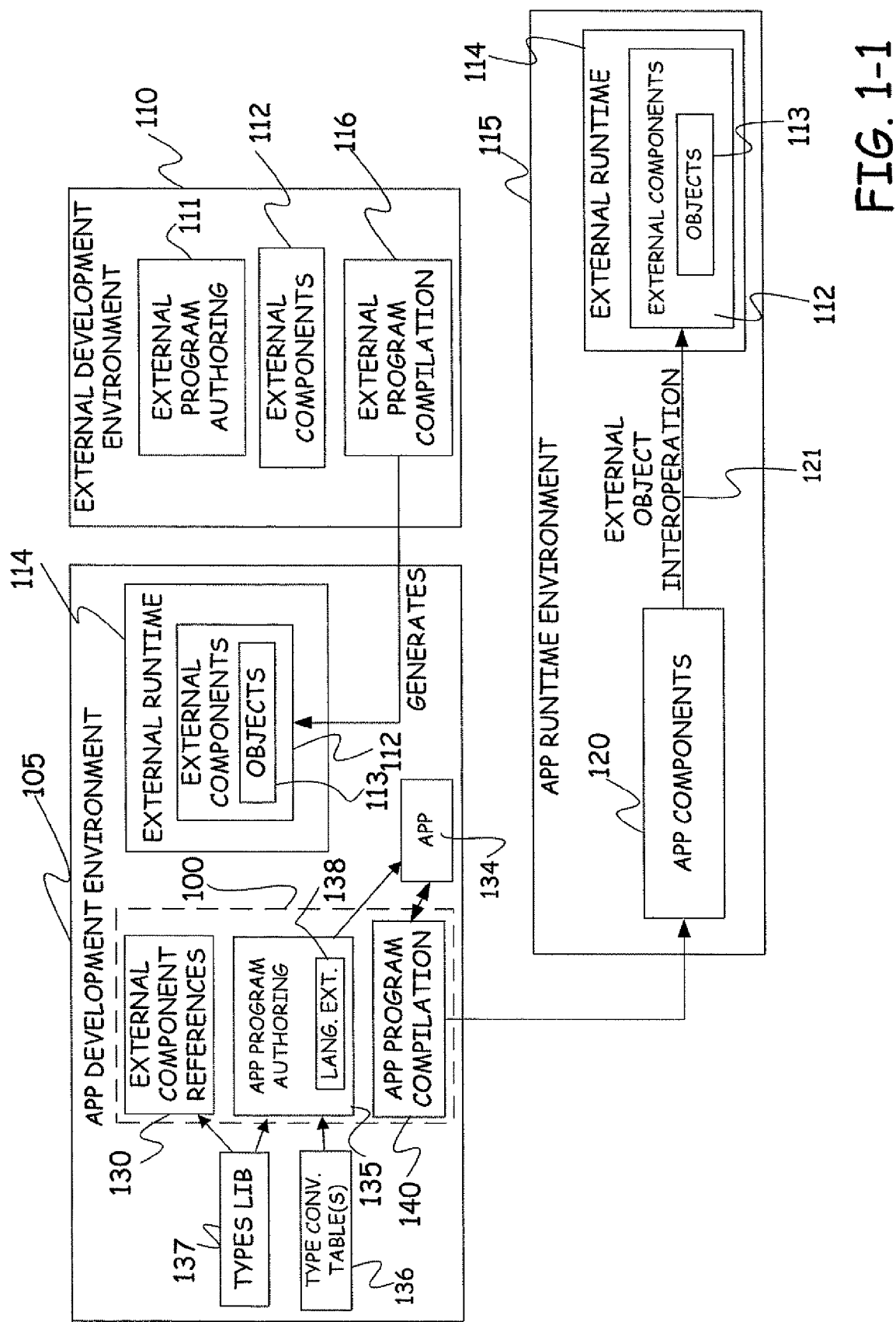
FIG. 1-1 is a block diagram illustrating embodiments of an application development system and environment.

Referring now to FIG. 1-1 shown is a block diagram illustrating an application development environment 105 in which an application development system 100 of disclosed embodiments is implemented. Also shown in FIG. 1-1 are an external development environment 110 and an application runtime environment 115.

Figures 1, 2:
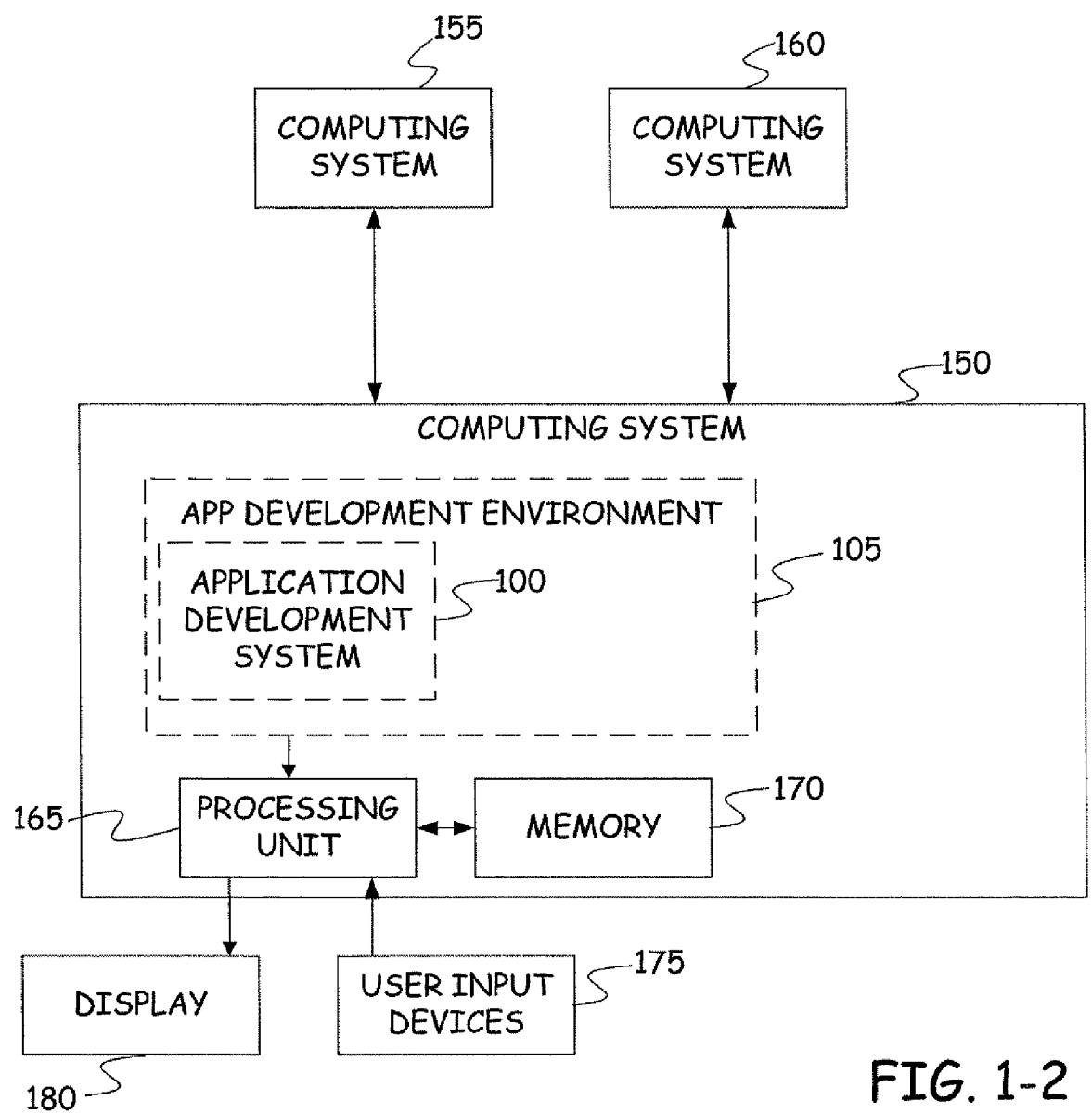
Figures 1, 2:
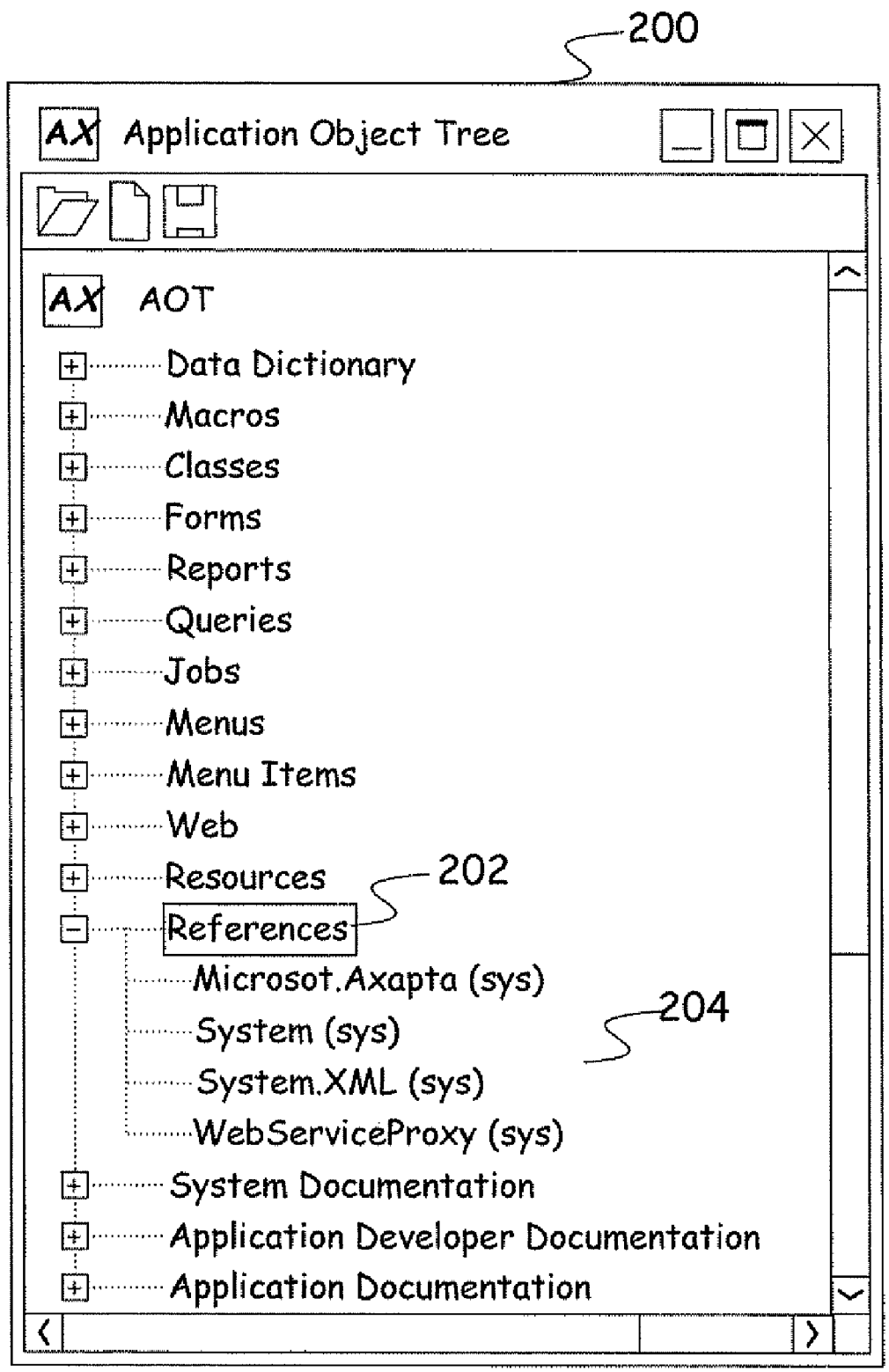
Figure 2:
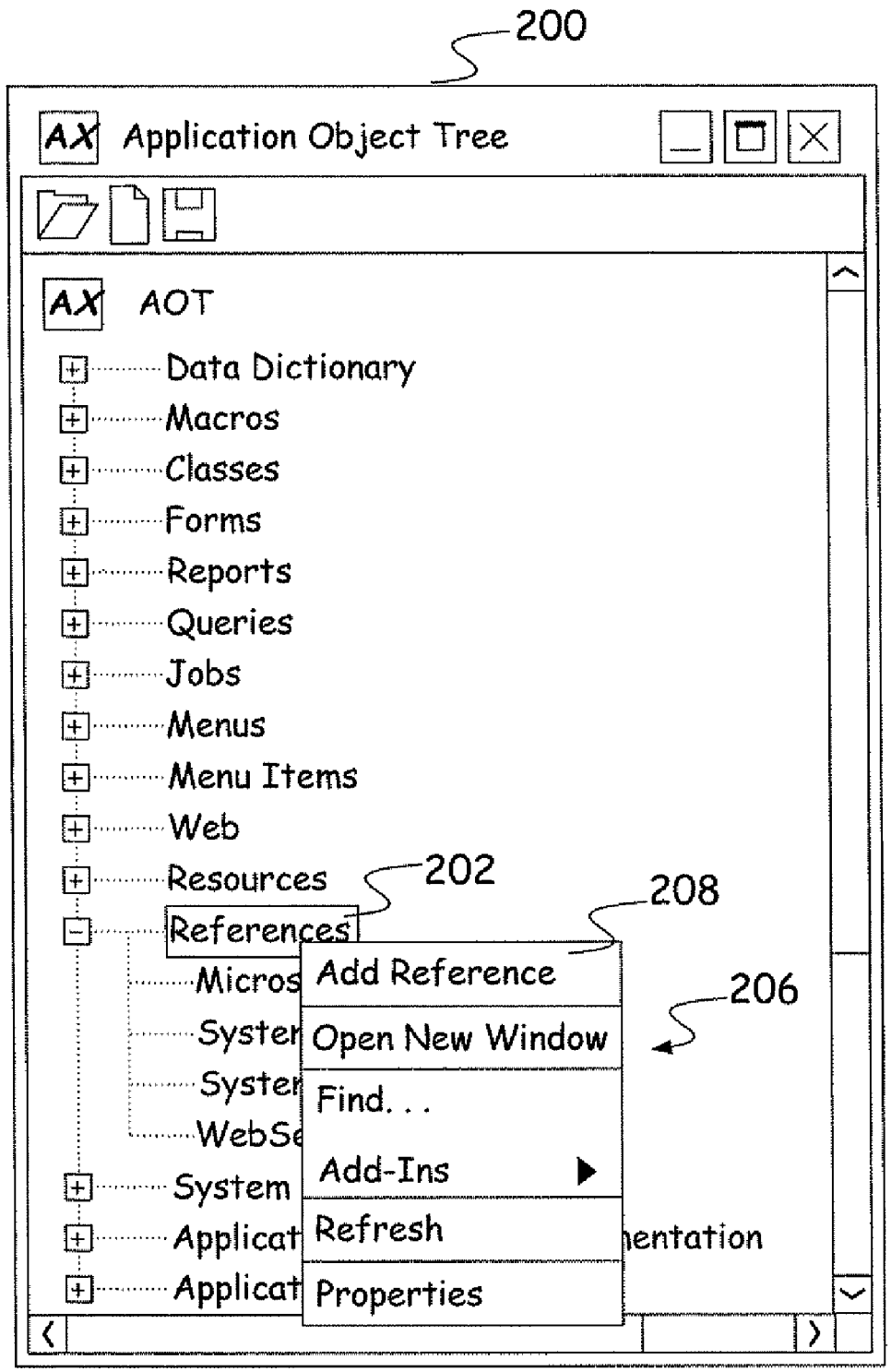

Referring for a moment to FIG. 1-2, shown is a computing system 150 in which application development environment 105 and application development system 100 are implemented. External development environment 110 and application runtime environment 115 can also be implemented within the same computing system 150, or they can be implemented in one or more separate computing systems, such as computing system 155 and/or computing system 160. Computing systems 155 and 160 can be networked computing systems, but this need not be the case. Computing system 150 is illustrated with an associated processing unit 165 and memory 170, which are configurable to implement the application development environment 105 and the application development system 100. As such, the configured processing unit 165 represents systems and components as described below. Similarly, memory 170 represents computer-readable medium storing computer-executable instructions for implementing disclosed systems, components, methods, etc. Those of skill in the art will recognize that memory 170 can take on any form, including ROM, RAM, hard disk memory, compact disk memory, removable memory devices, etc. Also shown in FIG. 1-2 are a display 180 on which graphical user interfaces (GUIs) of disclosed embodiments are generated, and user input devices for providing input to application development system 100.

Now referring back to FIG. 1-1, shown are the elements of a framework that increases developer productivity and reduces application runtime errors. Assume that an external development environment 110 is used to author (at external authoring step or component 111) external components 112 whose objects 113 are managed by an external runtime environment 114 upon external program compilation (as shown at reference number 116). External development environments for Java and Microsoft® .NET™ languages such as C#® are examples of external development environments 110. The framework 105 and application development system 100 for developing and executing application objects 120 that interoperate with external objects declared in these external components supports the following steps.

First, a referencing component 130 references external components 112 in an external development environment 110 from the application development environment 105. In this case, the external development environment 110 is an external managed code development environment, while application development environment 105 is an unmanaged code development environment. Once referenced, referencing component 130 reads type information for the referenced external component. Referencing component 130 can read or retrieve this information from the external development environment 110 in some embodiments, and/or in other embodiments it can read this information from a type library 137. The development environment is then aware of these external components and can thus use the metadata that describes these objects to support a developer when they write application programs that interoperate with these objects.

Referring for the moment to FIGS. 2-1 and 2-2, shown are representations of an application object tree (AOT) GUI 200 which the referencing component 130 uses to aid a user in referencing external components 112. In FIG. 2-1, 'References' node 202 in the AOT is shown as selected by the user, and it gives some examples of assembly references 204. These assemblies are either in the Global Assembly Cache (GAC) or are on the file system. FIG. 2-2 illustrates the menu 206 which is displayable upon selecting 'References' node 202, as well as the menu item 208 for adding an assembly reference node to the AOT. Upon referencing an external component, referencing component 130 reads in or retrieves type information for the external component for use in aiding a user in authoring an application program.

Referring now back to FIG. 1-1, after referencing an external component 112, an authoring component 135 aids a user in authoring unmanaged code application programs which interop with managed code components such as component 112. The authoring component uses the type information read from the referenced external component 112 to aid the user in writing correct code. Authoring component 135 also uses a language extension 138 that allows external objects 113 corresponding to the external component 112 to be created by an external managed code runtime environment 110 and which allows methods to be invoked on the external objects and object declarations. Authoring component 135 uses several techniques to provide the authoring aid.

Figures 1, 3:
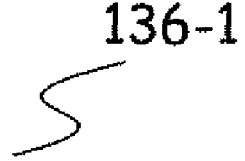

For example, in some embodiments, the authoring component provides mapping between value types in the unmanaged code (for example X++®) and common language runtime (CLR) types corresponding to the external managed code development environment 110. Using this mapping from one or more mapping tables 136, conversion of the types between the different runtime environments is provided. FIG. 3-1 is a table 136-1 which provides a general example of mapping between types. For example, the type denoted as typeA1 is mapped to the type denoted as typeB1, etc. FIG. 3-2 is a table 136-2 which illustrates a more particular example of such mapping between X++® types and CLR types. In this example, X++ AnyTypes are data types that are either primitives (e.g., Real) or structures (e.g., Date). Containers and Arrays are composite data types. The Dynamics Ax ClrInterop class provides static methods for converting between X++ types and their equivalent CLR Types. The disclosed embodiments are not limited by the example mapping tables illustrated in FIGS. 3-1 and 3-2.

Figure 5:
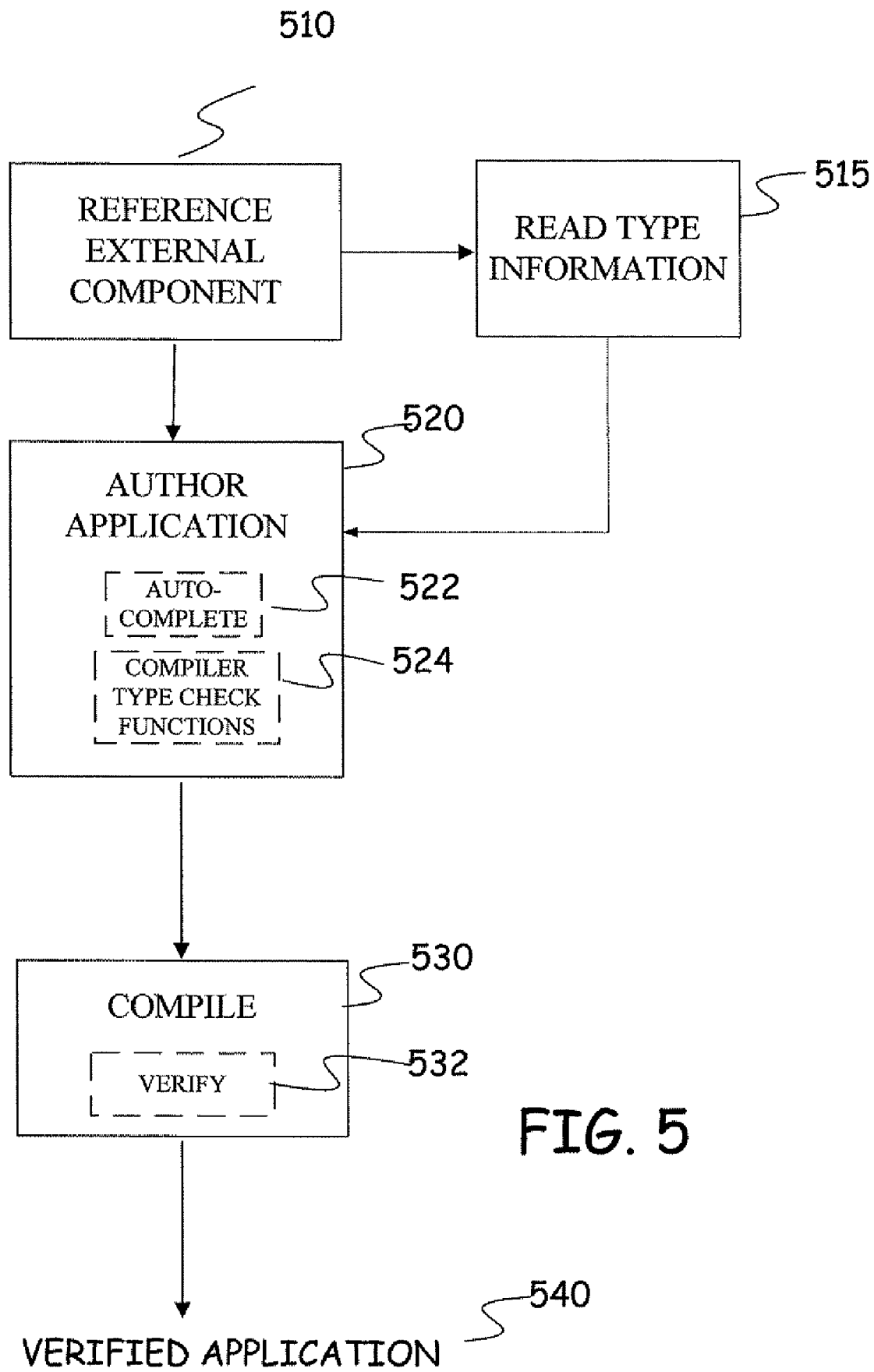

Another technique used by authoring component 135 to aid the user is an auto-completion of commands technique, for example such as the Microsoft® IntelliSense® technology, though other auto-completion technology can be used as well. FIGS. 4-1 through 4-5 illustrate auto-completion features implemented by authoring component 135 in some example embodiments when the user system 100 is authoring code. The auto-completion can be of commands relating to the referenced external component 112, providing context-sensitive lists that contain code and scripting elements relating to the referenced external component in the external managed code development environment. Auto-completion and providing information about types and functions in external components are together referred to here as authoring assistance.

Referring to FIGS. 4-1 and 4-2, in an authoring window 400, a list box 402 is displayed after the '.' character is typed. The list box 402 is populated with the public Types names in a types library and system assemblies library 137 in the example. Assembly inner classes, Interfaces and enums are also displayed. The auto-completion function loads assemblies into the Common Language Runtime (CLR) Bridge using the assembly reference properties in the AOT. It then uses reflection to load CLR type information. Syntax completion is also provided. In FIG. 4-2, no interfaces or enums are displayed in list box 402 because they cannot be created. As in each of FIGS. 4-1 through 4-5, the auto-complete function completes the authored expression if the user clicks on or otherwise selects one of the list box items.

FIG. 4-3 illustrates authoring window 400 with a list box 404 displaying CLR parameter signatures. List box 404 is displayed after the '(' symbol is typed. The list box is populated with parameter type signatures obtained by reflecting over the corresponding CLR type signature read from an assembly that corresponds to the AOT assembly reference. If there is only one parameter signature then the type at the corresponding argument position is bolded or otherwise highlighted as typing proceeds. In some embodiments, if there is more than one parameter signature then there is no bolding or highlighting.

FIG. 4-4 illustrates authoring window 400 with a list box 406 displaying CLR type methods after the '.' character is typed. The list box 406 is populated with public CLR type instance methods and properties (no fields) obtained by reflection. FIG. 4-5 illustrates list box 406 being displayed after the '::' character is typed. The list box is populated with public CLR type static methods obtained by reflection.

Referring back to FIG. 1-1, after program authoring, a compiler 140 compiles application components 120 whose objects are managed by an application runtime environment 115, and verifies type information of the external objects 113 created by the external managed code runtime environment 114. The application components 120 generated by the compiler 140 create the external objects 113 corresponding to the external component 112 by using external component references. These application components provide external object interoperation by invoking methods of the external objects and marshalling data types between the application components and the external objects.

FIG. 5 illustrates an embodiment of the above-described method of operation of application development system 100 in developing applications in an application development environment using an unmanaged code object oriented programming language. As shown at block 510, the method includes the step of referencing a managed code component from an external development environment. After referencing the managed code component, the method includes the step of reading type information for the referenced managed code component. As noted in detail above, the type information is then used to provide authoring assistance to a user. This is represented at block 520. For example, the type information can be used to provide auto-completion functions 522 and compiler type check functions 524. With the authoring assistance, the user creates an application in the application development environment using the unmanaged code object oriented programming language.

To further aid the user in developing the application, the method next includes compiling 530 the application in the application development environment into application components managed by an application runtime environment to verify (532) type information of external objects corresponding to the referenced managed code component and created using an external managed code runtime environment. Once verified, a verified application is provided.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An application development system, comprising:
   a referencing component configured to reference an external component in an external development environment and to read type information for the referenced external component, the external component having objects that are managed by an external runtime environment upon external compilation, the external component and the external development environment being associated with a first programming language, and wherein the external development environment is an external managed code development environment;
   an authoring component configured to aid a user in authoring an application in a second programming language, the authoring component using the type information read from the referenced external component and using a language extension that allows external objects corresponding to the external component to be created by an external runtime environment and which allows methods to be invoked on the external objects and object declarations, wherein the second programming language is an unmanaged code;
   a compiler configured to generate, from the application, application components managed by an application runtime environment, and to verify type information of the external objects created by the external runtime environment; and
   wherein the authoring component is further configured to provide auto-completion of commands for the user when the user is authoring code, the auto-completion of commands being facilitated by providing a list box to the user, the list box being positioned on a graphical user interface proximate to where the user is authoring the code.

2. The application development system of claim 1, wherein the application components generated by the compiler provide external object interoperation by invoking methods of the external objects and marshalling data types between the application components and the external objects, wherein the authoring component provides a mapping table to the user on a graphical user interface, the mapping table including multiple rows and multiple columns, each of the multiple columns corresponding to a different programming language, and each of the multiple rows including information about related types, the related types including primitives, structures, and composites.

3. The application development system of claim 1, wherein the authoring component is further configured to provide auto-completion of commands relating to the referenced external component in the external development environment, and wherein the referencing component references the external component through a type library.

4. The application development system of claim 3, wherein the authoring component is further configured to provide context-sensitive lists that contain code and scripting elements relating to the referenced external component in the external development environment, the context-sensitive lists being displayed upon the user typing a character.

5. The application development system of claim 4, wherein the authoring component provides the context sensitive lists by displaying the context sensitive lists to the user, and wherein the auto-completion includes loading assemblies into a common language runtime bridge by utilizing an assembly reference property and then utilizing reflection to load common language runtime type in formation.

6. The application development system of claim 4, wherein the authoring component is further configured to provide compiler type check functions, and wherein the auto-completion includes completing an expression upon the user selecting a list box item.

7. The application development system of claim 1, wherein the second programming language is a first object oriented programming language, and wherein the referencing component references the external component by retrieving information from the external development environment.

8. The application development system of claim 7, wherein the first programming language is in a second object oriented programming language, and wherein the information retrieved from the external development environment is metadata that describes the objects.

9. A computer-implemented method of developing an application in an application development environment using an object oriented programming language, the method comprising:
   referencing a component from an external development environment;
   reading type information for the referenced component; and
   using the type information read for the referenced component to provide authoring assistance to a user authoring the application in the application development environment using the application object oriented programming language, wherein using the type information read for the referenced component to provide authoring assistance further comprises auto-completing commands for the user when the user is authoring code, wherein auto-completing commands further comprises auto-completing commands relating to the referenced component and populating a list box that is displayed to a user by reflecting over a corresponding type signature, and wherein using the type information read for the referenced component to provide authoring assistance further comprises mapping between value types in an unmanaged code and a common language runtime, the common language runtime corresponding to the external development environment.

10. The computer-implemented method of claim 9, wherein auto-completing commands further comprises providing context-sensitive lists that contain code and scripting elements relating to the referenced component, wherein the list box is populated with parameter type signatures, and wherein the corresponding type signature is read from an assembly that corresponds to an assembly reference.

11. The computer-implemented method of claim 10, and further comprising providing compiler type check functions and utilizing a static method to convert between data types.

12. The computer-implemented method of claim 10, and further comprising compiling the application in the application development environment into application components managed by an application runtime environment to verify type information of external objects corresponding to the referenced component and created using an external runtime environment, and providing a verified application after verification of the type information.

13. An application development system, comprising:
- a referencing component configured to reference an external component in an external development environment and to read type information for the referenced external component, wherein the external development environment is an external managed code development environment; and
- an authoring component configured to aid a user in authoring an application, the authoring component using the type information read from the referenced external component and using a language extension that allows external objects corresponding to the external component to be created by an external runtime environment and which allows methods to be invoked on the external objects and object declarations, the authoring component aiding the user by providing an application object tree on a graphical user interface, the application object tree including a references node, the references node displaying, upon selection, examples of assembly references;
- a compiler configured to generate, from the application, application components managed by an application runtime environment, and to verify type information of the external objects created by the external runtime environment; and
- wherein the authoring component is further configured to provide auto-completion of commands for the user when the user is authoring code, the auto-completion of commands being facilitated by providing a list box to the user, the list box being positioned on a graphical user interface proximate to where the user is authoring the code.

14. The application development system of claim 13, wherein the assembly references are included within a file system.

15. The application development system of claim 13, wherein the assembly references are included within a global assembly cache.

16. The application development system of claim 13, wherein the application object tree includes a menu item, the menu item allowing for the user to add an additional assembly reference node to the application object tree.

* * * * *